United States Patent
Janszen et al.

(10) Patent No.: US 10,457,004 B2
(45) Date of Patent: Oct. 29, 2019

(54) METHOD FOR CENTERING A TIRE COMPONENT

(71) Applicant: VMI Holland B.V., Epe (NL)

(72) Inventors: Cornelis W. Janszen, Epe (NL); Gerrit Mulder, Epe (NL)

(73) Assignee: VMI HOLLAND B.V., Epe (NL)

( * ) Notice: Subject to any disclaimer, the term of this patent is extended or adjusted under 35 U.S.C. 154(b) by 428 days.

(21) Appl. No.: 15/032,722

(22) PCT Filed: Oct. 31, 2014

(86) PCT No.: PCT/NL2014/050757
§ 371 (c)(1),
(2) Date: Apr. 28, 2016

(87) PCT Pub. No.: WO2015/069102
PCT Pub. Date: May 14, 2015

(65) Prior Publication Data
US 2016/0263847 A1 Sep. 15, 2016

(30) Foreign Application Priority Data
Nov. 8, 2013 (NL) .................................. 2011764

(51) Int. Cl.
*B29D 30/44* (2006.01)
*B29D 30/00* (2006.01)
(Continued)

(52) U.S. Cl.
CPC ....... *B29D 30/0016* (2013.01); *B29D 30/005* (2013.01); *B29D 30/22* (2013.01);
(Continued)

(58) Field of Classification Search
CPC .. B29D 30/0016; B29D 30/005; B29D 30/08; B29D 30/22; B29D 30/2607;
(Continued)

(56) References Cited

U.S. PATENT DOCUMENTS 3,142,603 A * 7/1964 Parshall ................. B29D 30/20
156/264
4,359,675 A 11/1982 Miller, III
(Continued)

FOREIGN PATENT DOCUMENTS

| JP | 07195570 | 8/1995 |
| JP | 10146901 | 6/1998 |

(Continued)

OTHER PUBLICATIONS

Shinji-Ajino, JP-2010260178-A, machine translation. (Year: 2010).*
(Continued)

*Primary Examiner* — Robert C Dye
*Assistant Examiner* — Sedef E Paquette
(74) *Attorney, Agent, or Firm* — Stephen H. Eland; Dann, Dorfman, Herrell & Skillmann

(57) ABSTRACT

The invention relates to a method and centering assembly (1) for centering a tire component (9), wherein the method comprises the steps of placing the tire component on and conveying it from a first conveyor (2) towards a second conveyor (3), determining the position of a first longitudinal edge (91), transversely moving the first conveyor (2) and thereby aligning the first longitudinal edge (91) along a first reference on the second conveyor (3), conveying the tire component from the first conveyor (2) onto the second conveyor (3) while determining the position of a second longitudinal edge (92), wherein the tire component has a center between the first longitudinal edge (91) and the second longitudinal edge (92), conveying the tire component from the second conveyor (3) towards a drum (4), laterally moving the drum (4) to align the center of the tire component with a center of a desired application position of the tire component on the drum, and conveying the tire component from the second conveyor (3) onto the drum (4).

24 Claims, 11 Drawing Sheets

(51) Int. Cl.
    *B65H 23/032*     (2006.01)
    *B29D 30/22*      (2006.01)
    *B29D 30/30*      (2006.01)
    *B29D 30/20*      (2006.01)

(52) U.S. Cl.
    CPC ......... *B29D 30/3007* (2013.01); *B29D 30/44* (2013.01); *B65H 23/0326* (2013.01); *B29D 30/30* (2013.01); *B29D 2030/0038* (2013.01); *B29D 2030/204* (2013.01); *B29D 2030/3085* (2013.01); *B29D 2030/3092* (2013.01); *B29D 2030/4406* (2013.01); *B29D 2030/4418* (2013.01); *B65H 2301/3611* (2013.01); *B65H 2801/93* (2013.01)

(58) Field of Classification Search
    CPC ............... B29D 30/3007; B29D 30/44; B29D 2030/0038; B29D 2030/202; B29D 2030/204; B29D 2030/3085; B29D 2030/3092; B29D 2030/4418; B29D 30/1607; B29D 30/30; B29D 30/305; B29D 30/3021; B29D 30/3028; B29D 30/3057; B29D 30/42; B29D 2030/4406; B65H 23/0326; B65H 2301/3611; B65H 2801/93
    USPC .................................. 156/64, 397; 198/456
    See application file for complete search history.

(56) References Cited

U.S. PATENT DOCUMENTS

| | | | |
|---|---|---|---|
| 4,769,104 A | 9/1988 | Okuyama et al. | |
| 5,720,837 A | 2/1998 | Regterschot et al. | |
| 5,904,788 A | 5/1999 | Kitajima et al. | |
| 6,547,906 B1 | 4/2003 | Kolker et al. | |
| 6,994,140 B2 | 2/2006 | Kolker et al. | |
| 9,132,596 B2* | 9/2015 | Wedekind | B29D 30/3007 |
| 2003/0066610 A1* | 4/2003 | Kolker | B29D 30/44 156/394.1 |
| 2007/0003649 A1* | 1/2007 | Kaagman | B29D 30/3007 425/29 |
| 2007/0107848 A1* | 5/2007 | Hayashi | B29D 30/30 156/394.1 |
| 2008/0066533 A1* | 3/2008 | Beverly | B60C 23/002 73/146 |

FOREIGN PATENT DOCUMENTS

| | | |
|---|---|---|
| JP | 10156966 | 6/1998 |
| JP | 2001113610 | 4/2001 |
| JP | 3953818 | 8/2007 |
| JP | 2010260178 | 11/2010 |
| JP | 5322764 | 10/2013 |
| WO | 01/89813 | 11/2001 |
| WO | 2012/139556 | 10/2012 |
| WO | 2012139556 | 10/2012 |

OTHER PUBLICATIONS

Decision to Grant issued in Russian Patent Application No. 2016122442105 dated Jun. 15, 2018.
Search Report issued in Russian Patent Application No. 2016122442/05 dated Jun. 15, 2018.
Official Action issued in Chinese Patent Application No. 2014800603416 dated Mar. 22, 2017.
Decision to Grant issued in Japanese Patent Application No. 2016-552399 dated Feb. 13, 2019.

* cited by examiner

METHOD FOR CENTERING A TIRE COMPONENT

BACKGROUND

The invention relates to a method and a centering assembly for centering a tire component, in particular a breaker ply, with respect to a drum.

A method for centering a tire component with respect to a belt construction drum is known from U.S. Pat. No. 6,994,140 B2, in which a belt construction band is fed from a first conveyor towards a second conveyor until a first sensor between the two conveyors detects a side edge at the front tip of the belt construction band. The first of the two conveyors is moved laterally until an actual position of side edge corresponds to a desired position for said side edge on the belt construction drum. The belt construction band is subsequently moved onto the second conveyor while continuously aligning the side edge. At this moment, the actual width of the main part of the belt construction band is still unknown. During the movement of the belt construction band from the first conveyor onto the second conveyor, the opposite side edge is detected by a second sensor for determining the actual width of belt construction band. Now, the actual width can be detected. From the detected width, in accordance with a detected deviation of a desired center position from the measured or actual position of the width center, the first conveyor is again moved until the actual position of the width center corresponds to the desired center position of the belt construction band at the belt construction drum.

However, when the actual width of the belt construction band is greater or smaller than expected, the side edge of the front tip has already been aligned along a desired position for said side edge along an expected width, while the actual width requires a different desired position of the side edge. The front tip is already in adhesive friction with the second conveyor. The subsequent centering of the main part in a desired center position thus causes a considerable shift in the main part directly after the front tip, which significantly reduces the quality of the alignment.

It is an object of the present invention to provide a method and a centering assembly for centering a tire component, in particular a breaker ply, with respect to a drum, wherein the alignment or centering of the tire component with respect to the drum can be improved.

SUMMARY OF THE INVENTION

According to a first aspect, the invention provides a method for centering a tire component, in particular a breaker ply, with the use of a centering assembly, wherein the tire component comprises a leading end, a trailing end and a main part between the leading end and the trailing end, wherein the tire component is provided with a first longitudinal edge and a second longitudinal edge extending at least along the main part, wherein the centering assembly comprises a first conveyor, a second conveyor and a drum, wherein the method comprises the steps of:

a) placing the tire component on the first conveyor with its leading end facing in a first direction of conveyance defined by the first conveyor;

b) conveying the tire component from the first conveyor towards the second conveyor in the first direction of conveyance;

c) determining, at or near the leading end of the tire component, the lateral position of the first longitudinal edge with respect to a second direction of conveyance defined by the second conveyor;

d) moving the first conveyor transverse to the second direction of conveyance and thereby aligning the first longitudinal edge laterally, at least at the leading end, with respect to the second direction of conveyance along a first edge reference for said first longitudinal edge on the second conveyor;

e) conveying the tire component from the first conveyor onto the second conveyor in the first direction of conveyance while determining the lateral position of the second longitudinal edge with respect to the second direction of conveyance, wherein the tire component has a lateral center between the determined lateral positions of the first longitudinal edge and the second longitudinal edge;

f) conveying the tire component from the second conveyor towards the drum in the second direction of conveyance;

g) moving the drum laterally with respect to the second direction of conveyance to align a lateral center of a desired application position of the tire component on the drum with the lateral center of the tire component; and h) conveying the tire component from the second conveyor onto the drum for application of the tire component at the desired application position.

By splitting up the centering in two stages, the tire component can be aligned in the first stage with respect to the second conveyor, and in the second stage with respect to the drum. In particular, in the first stage, comprising steps b) to e), the first longitudinal edge of the tire component can be aligned along a first reference so that it can be properly aligned on the second conveyor. During the conveyance of the tire component from the first conveyor onto the second conveyor, the lateral position of the second longitudinal edge can already be determined, in preparation of the second stage. In the second stage, comprising steps f) to h), the center of the desired application position can be aligned with the center of the tire component between the lateral positions of the longitudinal edges as determined in step e), thereby preparing the drum for receiving the tire component aligned and centered with respect to the desired application position.

In an embodiment the lateral position of the first longitudinal edge is determined and the first conveyor is transversely moved prior to step e). In this manner, it can be prevented that the tire component is in adhesive contact with both the first conveyor and the second conveyor when the first conveyor is moved transversely, which would cause an undesirable deformation in the tire component.

In an embodiment the second longitudinal edge is determined and the drum is laterally moved prior to step h). In this manner, it can be prevented that the tire component is in adhesive contact with both the second conveyor and the drum when the drum is moved laterally, which would cause an undesirable deformation in the tire component.

In an embodiment the first longitudinal edge is determined in step c) between the first conveyor and the second conveyor. Thus, the first longitudinal edge can be determined upstream of the second conveyor, so that the first longitudinal edge can be aligned prior to moving onto the second conveyor.

Preferably, the second longitudinal edge is determined in step e) between the first conveyor and the second conveyor. Thus, the second longitudinal edge can be detected upstream of the second conveyor and the drum in preparation of step g). As a result, the drum can already be moved laterally prior to step h), without the need of a determination of the second longitudinal edge at the second conveyor and/or between the second conveyor and the drum.

In an embodiment the leading end is provided with a leading edge extending under an oblique angle with respect to the longitudinal edges, wherein the first longitudinal edge extends along the main part and the leading end, wherein at least part of the first longitudinal edge at the leading end of the tire component is aligned along the first edge reference for said first longitudinal edge in step d). Thus, at least the first longitudinal edge at the leading end can be aligned along the first edge reference.

In an embodiment, in step e), the lateral position of the second longitudinal edge is first determined at or near the transition from the leading end to the main part, wherein, during the subsequent conveyance of the tire component from the first conveyor to the second conveyor in step e), the first conveyor is moved transverse with respect to the first direction of conveyance for aligning the lateral center of tire component, at least at the main part, with the lateral center between the determined lateral positions of the longitudinal edges at or near the transition from the leading end to the main part. Thus, the main part can be centered or aligned, irrespective of the individual lateral positions of the longitudinal edges.

In an embodiment the trailing end is provided with a trailing edge extending under an oblique angle with respect to the longitudinal edges, wherein the second longitudinal edge extends along the main part and the trailing end, wherein, after the determination of the lateral position of the second longitudinal edge in step e), at least part of the second longitudinal edge at the trailing end of the tire component is aligned along a second edge reference for said second longitudinal edge on the second conveyor in step e). Thus, not only the leading end and the main part of the tire component, but also the trailing end can be aligned along a reference, thereby obtaining an optimally prepared tire component on the second conveyor.

In an embodiment the leading end and the trailing end are provided with a leading edge and a trailing edge, respectively, extending under an oblique angle with respect to the longitudinal edges, wherein during the conveyance of the trailing end from the first conveyor to the second conveyor in step e), the first conveyor is moved transverse to the second direction of conveyance to match the shape of at least part of the trailing edge to the shape of the leading edge. This can increase the quality of the splice when the tire component is applied to the drum.

In an embodiment the centering assembly is provided with one or more sensors for detecting the lateral positions of one or more edges of the tire component and a control system that controls the transverse movement of the first conveyor and the lateral movement of the drum in steps d) and g) based on the detection of the lateral positions of the one or more edges by the one or more sensors. The control system can analyze, calculate and determine the required amounts of transverse and lateral movements for proper alignment, and control the transverse and lateral movements accordingly.

In an embodiment the one or more sensors are arranged between the first conveyor and the second conveyor. Typically, the first conveyor and the second conveyor are spaced apart, so that in between the conveyors, the one or more sensors can have a substantially clear line of sight onto the tire component.

In an embodiment the one or more sensors comprise a line camera for detecting the lateral positions of one or more edges of the tire component along a laterally extending detection line. One line camera can detect both the first longitudinal edge as well as the second longitudinal edge.

In an embodiment the control system controls the transverse movement of the first conveyor in step d) upstream of the one or more sensors. The control system can thus function as a feedback control system which corrects the detected lateral position of the first longitudinal edge to be in line with a reference for said first longitudinal edge.

In an embodiment the control system controls the lateral movement of the drum in step g) downstream of the one or more sensors. The control system can thus also or alternatively function as a feedforward control system which prepares the center of the desired application position to be in line with center of the tire component.

In an preferred embodiment step d) comprises determining the lateral position of the first longitudinal edge based on the detection signals from the one or more sensors, comparing the determined lateral position to a desired lateral position on the second conveyor for said first longitudinal edge, determining the required amount of transverse movement of the first conveyor with respect to the second conveyor for aligning the determined lateral position of the first longitudinal edge with the desired lateral position, sending a control signal from the control system to a first drive associated with the first conveyor for controlling the transverse movement of the first conveyor until the determined lateral position of the first longitudinal edge is aligned along the desired lateral position for said first longitudinal edge.

In a preferred embodiment step e) comprises determining the lateral position of the second longitudinal edge based on the detection signals from the one or more sensors, wherein step g) comprises determining the lateral center between the determined lateral positions of the first longitudinal edge and the second longitudinal edge, determining the required amount of lateral movement of the drum with respect to the second conveyor for aligning the lateral center of tire component with the center of the desired application position on the drum, sending a control signal from the control system to a second drive associated with the drum for controlling the lateral movement of the drum until the determined lateral center of the tire component is aligned with the center of the desired application position on the drum.

Preferably, the determination of the lateral center comprises the step of the control system assigning a center reference to the lateral center between the determined lateral positions of the first longitudinal edge and the second longitudinal edge at least at one longitudinal position along the tire component. By aligning the center reference with the center plane, the aligning and the centered application of the tire component on the desired application position can be further improved.

In an embodiment the control system is provided with a memory component, wherein the matching of the shape of the at least part of the trailing edge to the shape of the leading edge during step e) comprises determining and storing lateral positions of the leading edge based on the detection signals from the one or more sensors, determining for each of the stored lateral positions of the leading edge, at a predetermined distance upstream of the stored lateral position, the lateral position of the trailing edge, comparing the determined lateral position of the trailing edge to the stored lateral position of the leading edge, determining the required amount of transverse movement of the first conveyor with respect to the second conveyor for aligning the determined lateral position of the trailing edge with the stored lateral position of the leading edge, sending a control signal from the control system to a first drive associated with the first conveyor for controlling the transverse movement of the first conveyor until the determined lateral position of the trailing edge is aligned at the stored lateral position of the leading edge. By matching the shape of the trailing edge to the leading edge at longitudinal positions that are spaced apart over a predetermined length, the length of the tire component between the lateral positions as measured at the leading edge and the trailing edge can be kept substantially constant. Preferably, the predetermined distance is corresponds to or substantially corresponds to the desired circumferential length of the tire component when the tire component is applied to the drum. In this manner, it can be ensured that, after application of the tire component to the drum, the leading edge meets the trailing edge, in order to close the splice between said edges.

In an embodiment the transverse movement of the first conveyor is a lateral movement. By moving the first conveyor laterally, the tire component can be positioned laterally with respect to the second conveyor.

In an alternative embodiment the transverse movement of the first conveyor comprises a rotation of an end of the first conveyor facing the second conveyor about a pivot point located at the opposite end of the first conveyor with respect to the second conveyor. The rotation of the first conveyor can cause a substantially lateral movement of the end of the first conveyor facing the second conveyor. The tire component, leaving the first conveyor at the end of the first conveyor facing the second conveyor, can thus be aligned laterally with respect to the second conveyor.

In an embodiment, between steps b) and g), a subsequent cycle of the steps of the method is already started by placing a subsequent tire component on the first conveyor according to step a) and/or by conveying the subsequent tire component from the first conveyor towards the second conveyor according to step b). This may increase the efficiency of the method and/or the capacity of the centering assembly.

In an embodiment one or both of steps c) and d) for a subsequent cycle of the method take place simultaneously with one or both of steps f) and g) of the previous cycle of the method. Thus, the subsequent tire component can closely follow the previous tire component. In particular, it is noted that the first longitudinal edge of the subsequent tire component can already be aligned on the first conveyor without influencing the remaining steps of the method for the previous tire component which is present on the second conveyor. Furthermore, it is noted that the subsequent tire component can already be conveyed onto the second conveyor while the previous tire component is being conveyed onto the drum. In such a situation, the second longitudinal edge of the subsequent tire component may already be detected, provided that the drum is only moved laterally based on said detection after the previous tire component has been conveyed completely onto the drum.

In an embodiment the subsequent tire component is moved in the first direction of conveyance at a distance from the tire component that is previously conveyed in said first direction of conveyance. Otherwise, the previous tire component and the subsequent tire component can not be distinguished from each other at the detection of the first longitudinal edge and the second longitudinal edge.

According to a second aspect, the invention provides a centering assembly for centering a tire component, in particular a breaker ply, wherein the tire component comprises a leading end, a trailing end and a main part between the leading end and the trailing end, wherein the tire component is provided with a first longitudinal edge and a second longitudinal edge extending at least along the main part, wherein the centering assembly comprises a first conveyor defining a first direction of conveyance, a second conveyor defining a second direction of conveyance and a drum, wherein the centering assembly further comprises a first drive for moving the first conveyor in a direction transverse to the second direction of conveyance, a second drive for moving the drum laterally with respect to the second direction of conveyance, a control system for controlling said drives and one or more sensors arranged for detecting edges of the tire component and for sending detection signals indicative of the lateral positions of said edges to the control system, wherein the control system is arranged for determining the lateral positions of the first longitudinal edge and the second longitudinal edge based on the detection signals, wherein the tire component has a lateral center between the determined lateral positions of the longitudinal edges, wherein the control system is arranged for controlling the transverse movement of the first conveyor based on the detection signals indicative of the lateral position of the first longitudinal edge to align the first longitudinal edge laterally, at least at the leading end, with respect to the second direction of conveyance along a first edge reference for said first longitudinal edge on the second conveyor, wherein the control system is further arranged for controlling the lateral movement of the drum to align a lateral center of a desired application position of the tire component on the drum with the lateral center of the tire component.

Analogous to the method, the centering assembly is essentially arranged for alignment of the tire component with respect to the desired application position of the tire component in two stages.

In an embodiment the second conveyor is fixed with respect to its surroundings in the lateral direction with respect to its second direction of conveyance. The fixed lateral position of the second conveyor allows for the two stage alignment as described above. Furthermore, it can facilitate starting a subsequent alignment of a subsequent tire component in the first stage of the alignment while the tire component of the previous cycle is being aligned in the second stage of the alignment.

In an embodiment the one or more sensors are arranged between the first conveyor and the second conveyor. Typically, the first conveyor and the second conveyor are spaced apart, so that in between the conveyors, the one or more sensors can have a substantially clear line of sight onto the tire component.

In an embodiment the control system is operationally coupled to and is arranged for controlling the first drive upstream of the one or more sensors. The control system can thus function as a feedback control system which corrects the detected lateral position of the first longitudinal edge to be in line with a reference for said first longitudinal edge.

In an embodiment the control system is operationally coupled to and is arranged for controlling the second drive downstream of the one or more sensors. The control system can thus also or alternatively function as a feedforward control system which prepares the center of the desired application position to be in line with center of the tire component.

In an embodiment the one or more sensors comprise a line camera for detecting the lateral positions of the edges of the tire component along a laterally extending detection line. One line camera can detect both the first longitudinal edge as well as the second longitudinal edge.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 1:
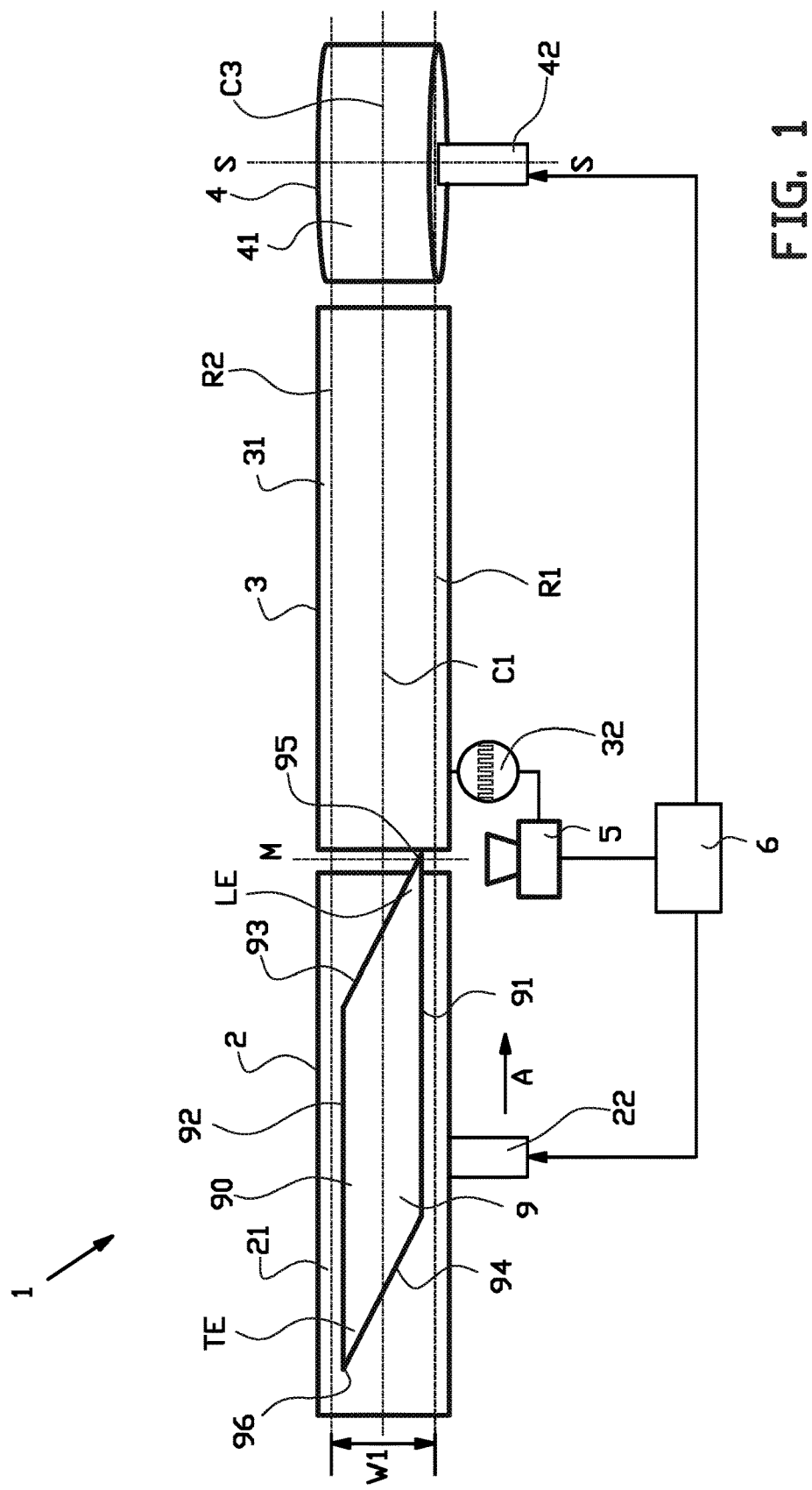
FIG. 1 shows a centering assembly with a first conveyor, a second conveyor and a drum in an initial situation prior to a method of centering a breaker ply on the drum, according to a first embodiment of the invention.

FIGS. 1-9 show a centering assembly 1 with a first conveyor 2, a second conveyor 3 and a building drum 4, according to an exemplary first embodiment of the invention. The centering assembly 1 is used in a method for centering and applying a tire component, in particular a belt component such as a breaker ply 9, to the drum 4.

The first conveyor 2 is a roller-type conveyor, comprising a plurality of mutually parallel rollers (not shown), which together form a first conveyor surface 21 as schematically shown in FIGS. 1-5. In operation, the first conveyor 2 is arranged for conveying the breaker ply 9 in a first feed direction or direction of conveyance A towards the second conveyor 3. The centering assembly 1 is provided with a first transverse or lateral drive 22 for moving the first conveyor 2 sideways or laterally with respect to the direction of conveyance A thereof, in particular back and forth in a first lateral or transverse direction T1, substantially perpendicular to the direction of conveyance A of the first conveyor 2 and parallel to the first conveyor surface 21.

Similar to the first conveyor 2, the second conveyor 3 is a roller-type conveyor with rollers forming a second conveyor surface 31. In operation, the second conveyor 3 is arranged for conveying the breaker ply 9 in a feed direction or direction of conveyance B, parallel to the direction of conveyance A of the first conveyor 2, towards the drum 4. During operation, the second conveyor 3 is arranged to remain stationary in direction sideways to its direction of conveyance B. The second conveyor 3 can for example be fixed with respect to its surroundings, for example to a factory floor (not shown). The second conveyor is preferably provided with magnets or other means for retaining the breaker ply 9 on the second conveyor surface 31.

Optionally, one of the conveyors 2, 3 is provided with an encoder 32 for emitting regular pulses for a predetermined increment or distance that the breaker ply 9 moves in the respective direction of conveyance A, B. Preferably, the encoder 32 is operationally coupled to the second conveyor 3, because the second conveyor 3 is provided with means for retaining the breaker ply 9 and thus is the most reliable indicator for the distance that the breaker ply 9 moves in the direction of conveyance B of the second conveyor 3.

The drum 4 comprises a circumferential surface 41 for receiving the breaker ply 9. The drum 4 is rotatably arranged about a rotational center axis S, concentric to the circumferential surface 41. The centering assembly 1 is provided with a second transverse or lateral drive 42 for moving the drum 4 sideways, transverse or laterally with respect to the direction of conveyance B of the second conveyor 3, in particular back and forth in a second lateral or transverse direction T2, parallel to the rotational axis S of the drum 4. The drum 4 has a reference plane or center plane C3 that extends radially with respect to the rotational center axis. The center plane C3 defines the center of a desired application position of the breaker ply on the circumferential surface 41. Although in this example, the center plane C3 extends in the center between the two extremities of the circumferential surface 41, the center plane C3 can also be offset to one of the extremities, depending on the desired application position of the breaker ply 9 on the circumferential surface 41 and the associated center position of the breaker ply 9 on said desired application position.

Thus, both the first conveyor 2 and the drum 4 are arranged to be sideways or laterally moveable with respect to the second conveyor 3, in particular in a direction perpendicular to the direction of conveyance A, B of both conveyors 2, 3 and parallel to the rotational axis S of the drum 4.

The breaker ply 9 is initially supplied to or placed on the first conveyor surface 21 of the first conveyor 2. The breaker ply 9 has been cut-to-length out of a continuous length with a first longitudinal edge 91 and a second longitudinal edge 92 substantially parallel to the first longitudinal edge 91. The breaker ply 9 is arranged on the first conveyor surface 21 with its longitudinal edges 91, 92 extends substantially parallel to the direction of conveyance A of the first conveyor 2. The cut-to-length breaker ply 9 is provided with a leading end LE facing downstream towards the second conveyor 3 and the drum 4, an opposite trailing end TE facing upstream and a main part 90 in between the leading end LE and the trailing end TE. The leading end LE and the trailing end TE have been cut under substantially the same oblique breaker angle with respect to the longitudinal edges 91, 92 to obtain a substantially parallelogram-like outer contour for the breaker ply 9. In this example, the main part 90 is substantially rectangular in shape. Due to the breaker angle, the breaker ply 9 comprises a leading edge 93 and a trailing edge 94 extending under an oblique angle with respect to the direction of conveyance A of the first conveyor 2, parallel to the first conveyor surface 21. In the distal ends of the leading end LE and the trailing end TE, The leading edge 93 and the trailing edge 94 meet the longitudinal edges 91, 92 under a sharp angle in a leading tip 95 and a trailing tip 96.

For the purpose of centering the breaker ply 9 prior to its application to the drum 4, the centering assembly 1 is provided with a sensor or a plurality of sensors, for example an optical camera with image recognition capabilities, a camera in combination with one or more projection means (single laser line or laser triangulation) or other means for detecting contours or edges of the breaker ply 9. In this example, the one or more sensors comprise a line camera 5 which is arranged at the transition from the first conveyor 2 to the second conveyor 3. The line camera 5 is operationally coupled to the encoder 32 of the second conveyor 3, such that measurements can be taken at each pulse of the encoder 32, thereby ensuring that the measurements are taken at exact intervals corresponding to a predetermined distance conveyed by the first conveyor 2 in its direction of conveyance A. The line camera 5 is arranged for optically detecting the contours of the breaker ply 9 along a measuring line M, with the use of projecting means, such as a laser for projecting a laser line along the measuring line M. The measuring line M extends in the transition between the subsequent conveyors 2, 3 in a direction transverse or perpendicular to the directions of conveyance A, B of both conveyors 2, 3. The line camera 5 can subsequently optically scan for or detect changes, such as interruptions or transitions in the contour of the breaker ply 9 along said measuring line M, and thereby obtain or derive position data of the contour of the breaker ply 9 along said measuring line M. The first conveyor 2 and the second conveyor 3 are slightly spaced apart at said transition to facilitate a clear line of sight on the measuring line M between the breaker ply 9 and the line camera 5.

The line camera 5 is operationally connected to a control system 6 for controlling the lateral drives 22, 42 of the first conveyor 2 and the drum 4. The control system 6 is programmed with a predetermined first edge reference, edge reference position or edge reference line R1, representative of the desired lateral position along which the leading tip 95 and the associated first longitudinal edge 91 should be aligned on the second conveyor 2 for proper application to the drum 5. Optionally, the control system 6 is further programmed with a second edge reference, edge reference position or edge reference line R2, parallel to and spaced apart from the first edge reference line R1, which second edge reference line R2 defines the theoretical position of the second longitudinal edge 92, based on a theoretical, assumed or expected width W1 of the breaker ply 9. Additionally, an optional theoretical, assumed or expected center C1 can be determined extending in the center between the first edge reference line R1 and the second edge reference line R2.

Figure 6:
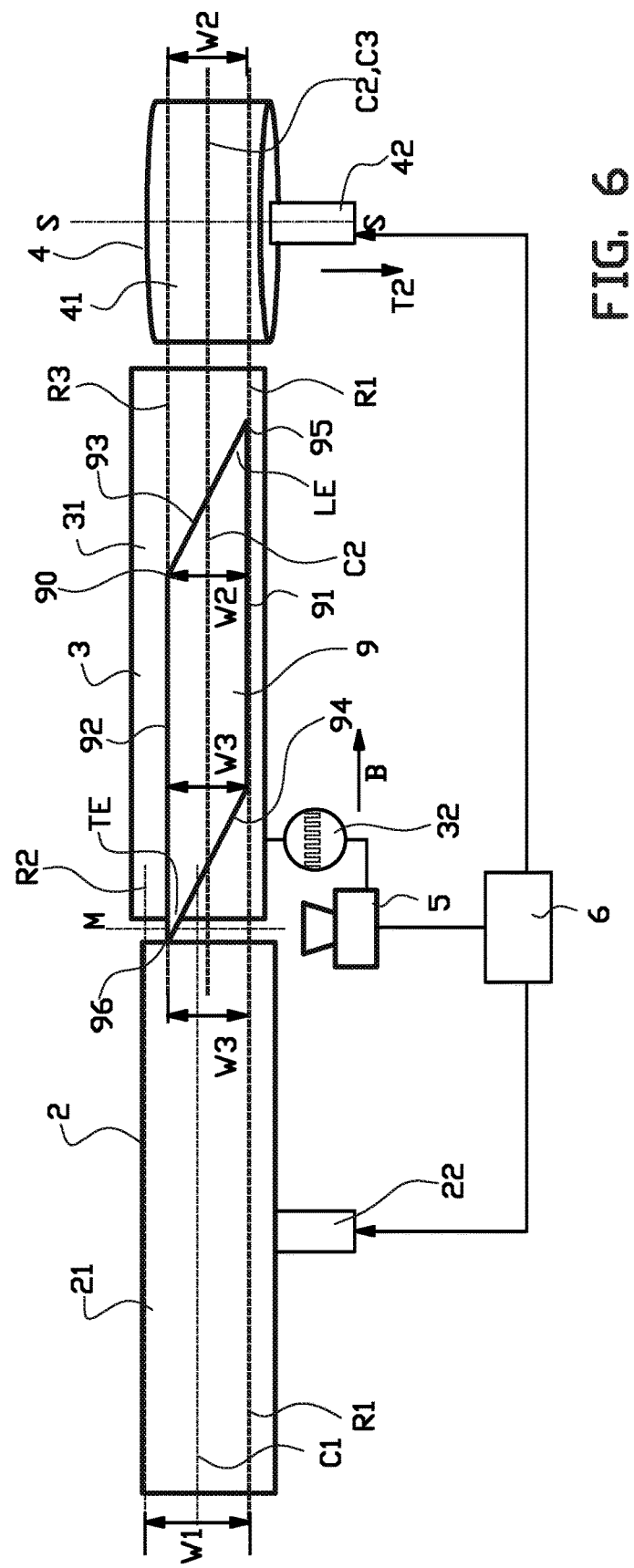
Figure 7:
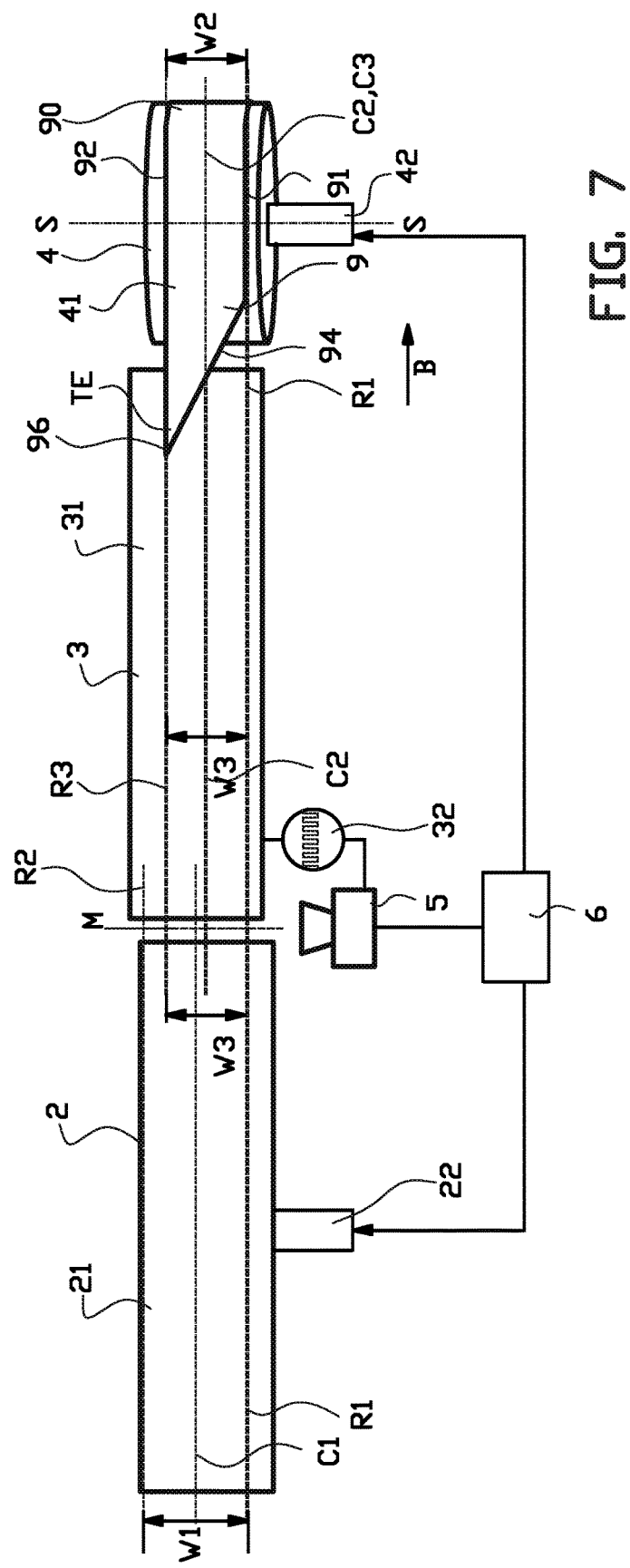

The method for centering the breaker ply 9 with respect to the drum 4 and for applying the breaker ply 9 in a desired application position to the drum 4 will be elucidated below with reference to FIGS. 1-7. The method essentially comprises two stages of centering or aligning. The first stage comprises the transfer of the breaker ply 9 from the first conveyor 2 to the second conveyor 3, as shown in FIGS. 1-5. The second stage comprises the transfer of the breaker ply 9 from the second conveyor 3 onto the drum 4, as shown in FIGS. 6 and 7.

In FIG. 1, an initial situation is shown in which the breaker ply 9 is supplied to or placed on the first conveyor surface 21 of the first conveyor 2 in the orientation as described above. The first conveyor 2 is operated to convey the breaker ply 9 in the direction of conveyance A towards the second conveyor 3 until the leading end LE, and more in particular the leading tip 95 thereof crosses or intersects with the measuring line M of the line camera 5. At this moment, the line camera 5 is able to detect the lateral position of the leading tip 95 along the measuring line M. The leading tip 95 has not moved onto the second conveyor surface 31 of the second conveyor 3 yet.

Data about the lateral position of the leading tip 95 is send as detection signals to the control system 6 for processing. Prior to the leading tip 95 moving onto the second conveyor surface 31, the control system 6 can determine, based on the obtained data, the distance over which the first conveyor 2 has to be translated or moved laterally in the first transverse direction T1 to position the leading tip 95 along the first edge reference line R1. The control system 6 controls the first conveyor 2 upstream of the position at which the measurement has taken place. Thus, in this particular situation, the control system 6 functions as a feedback control system 6.

Figure 2:
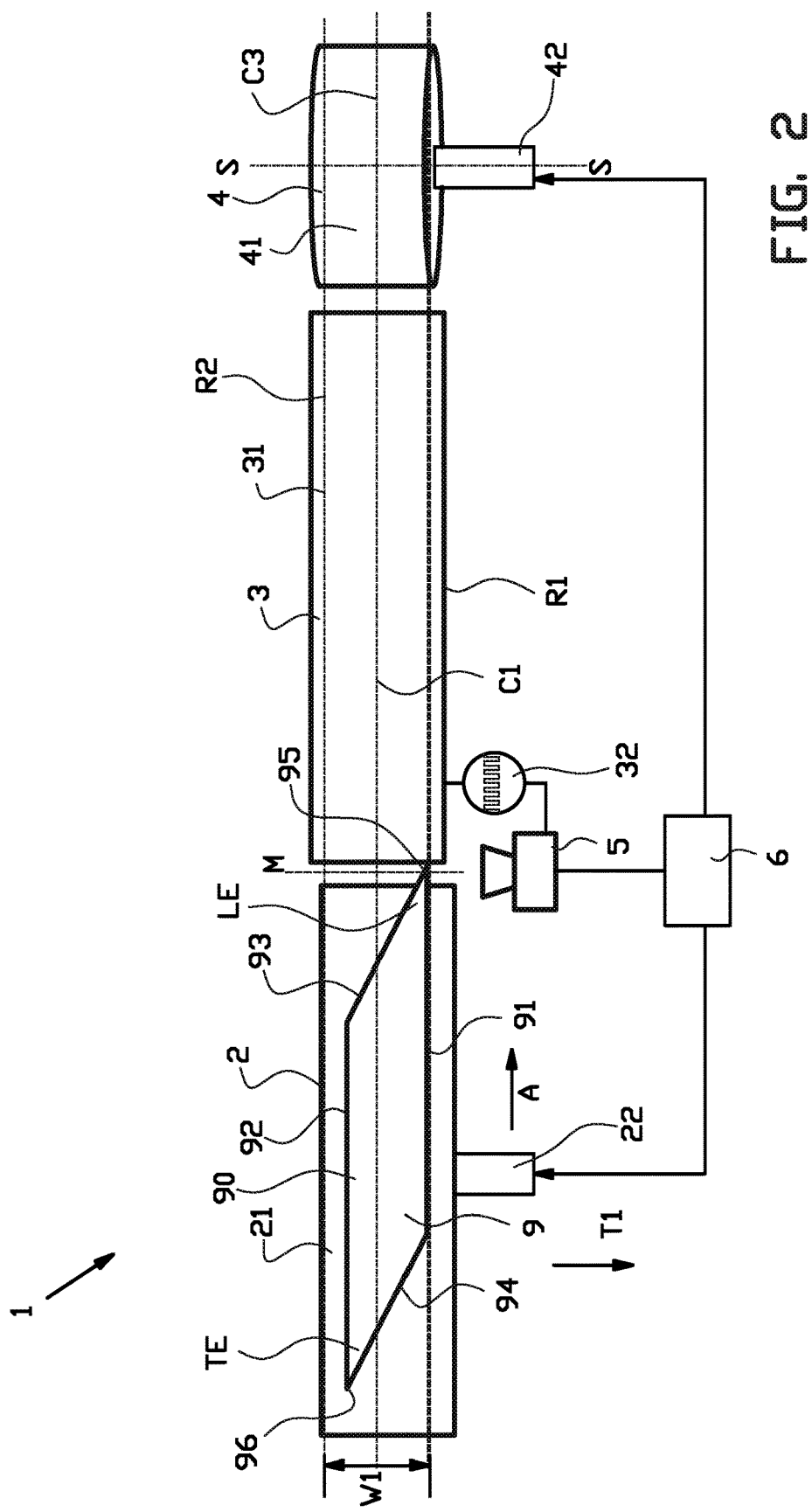
FIGS. 2-7 show the subsequent steps of the method for centering the breaker ply on the drum according to FIG. 1.

In FIG. 2, the situation is shown in which the control system 6 has send control signals to the first drive for moving the first conveyor 2 laterally in the first transverse direction T1. The first conveyor 2 is moved transversely over the distance determined by the control system 6 so that the leading tip 95 is moved laterally towards and positioned along the first edge reference line R1. Once the leading tip 95 is positioned along the first edge reference line R1, the first conveyor 2 and the second conveyor 3 are simultaneously operated to convey the leading end LE of the breaker ply 9 in the conveying direction A of the first conveyor 2 from the first conveyor surface 21 onto the second conveyor surface 31. During the conveyance, the line camera 5 continues to obtain data about the lateral position of the first longitudinal edge 91 at the leading end LE, which data is continuously or regularly fed as detection signals to the control system 6. Based on the detection signals, the control system 6 sends control signals, if necessary, to the first lateral drive 22 for laterally moving the first conveyor 2 with respect to the second conveyor 3 and for, as a result of said lateral movement, correcting deviations in the lateral position of said first longitudinal edge 91 along the first reference R1. Ultimately, the first longitudinal edge 91, at least along the leading end LE, is aligned properly along the first reference R1. Slightly curvilinear deviations in the first longitudinal edge 91 can be corrected to a more linear shape.

Figure 3:
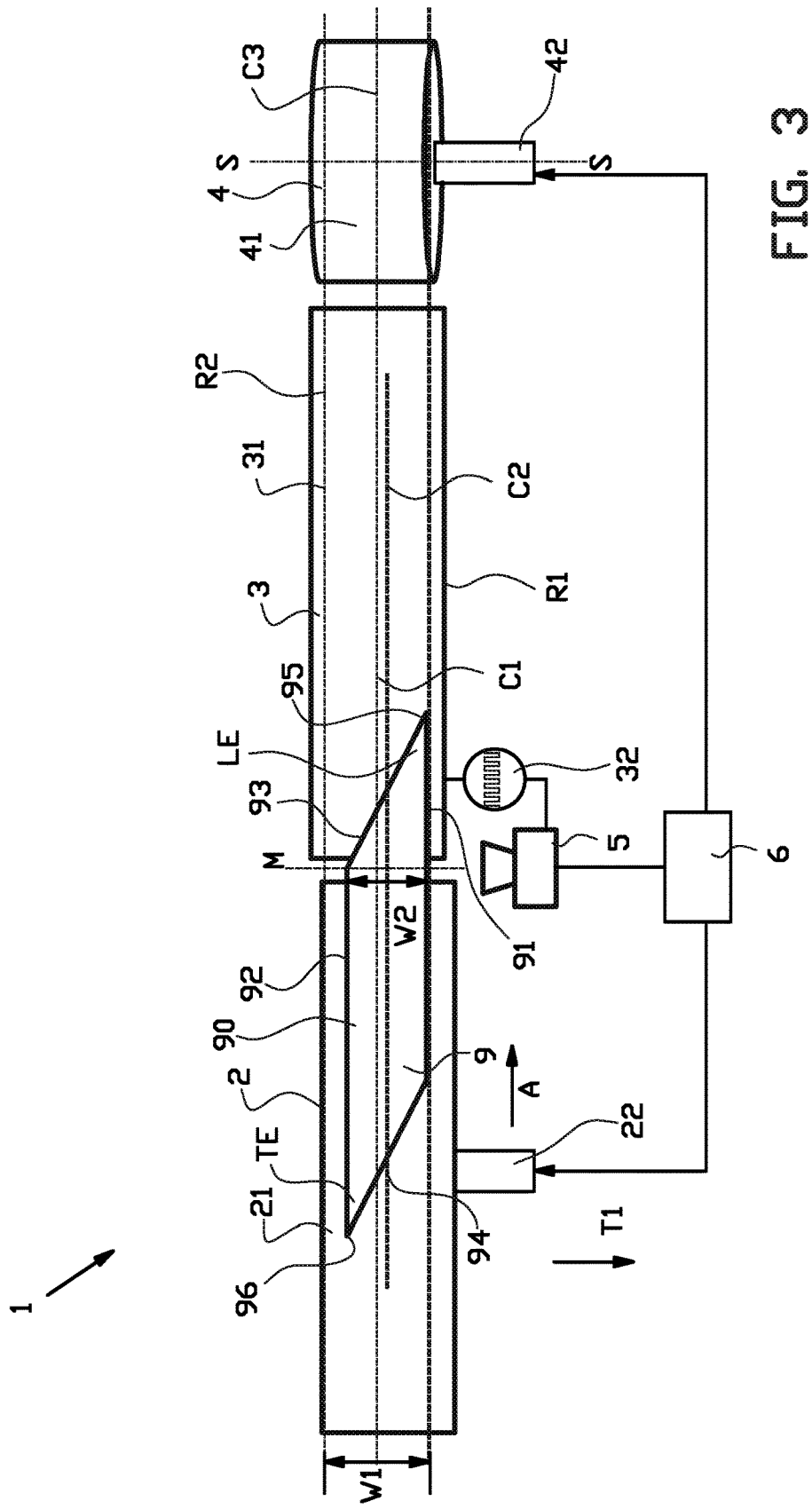

In FIG. 3 the situation is shown in which the leading end LE of the breaker ply 9 has been moved onto the second conveyor 3, while the main part 90 of the breaker ply 9 starts to cross the measuring line M. Until now, the line camera 5 has only detected the gradually increasing width of the breaker ply 9 due to the oblique angle of the leading edge 93. When the main part 90 of the breaker ply 9 starts to cross the measuring line M, the detected width of the breaker ply 9 no longer increases or stays substantially the same. The control system 6 interprets the detection signals from the line camera 5 and assumes that the main part 90 of the breaker ply 9 has arrived at the measuring line M. The control system 6 derives from the detection signals that the lateral position data at the transition from the obliquely extending leading edge 93 to the second longitudinal edge 92 of the main part 90 of the breaker ply 9 is representative of the lateral position of the second longitudinal edge 92, and assigns a third edge reference, edge reference position or edge reference line R3 to this lateral position.

Alternatively, the lateral position of the second longitudinal edge 92 may be detected optically as soon as or shortly after the moment that the second longitudinal edge 92 crosses the measuring line M.

Now that both the lateral positions of both the first longitudinal edge 91 and the second longitudinal edge 92 are detected or determined, the actual width W2 at the transition from the leading end LE to the main part 90 of the breaker ply 9 can be determined. The actual width W2 is determined as the distance between the first edge reference line R1 and the third edge reference line R3 at said transition. The control system 6 may compare the actual width W2 with the expected width W1 to assess or analyze deviations thereof. If the deviation exceeds a certain threshold, the method can be interrupted and the breaker ply 9 can be removed.

In FIG. 3, the first longitudinal edge 91 along the leading end LE of the breaker ply 9 has been aligned along the first edge reference line R1 in a desired lateral position on the second conveyor surface 31. Before moving the main part 90 of the breaker ply 9 onto the second conveyor 3, the control system 6 first determines a center reference, center reference point or reference center line C2 of the breaker ply 9 at a lateral center or the actual center between the determined lateral positions of the first longitudinal edge 91 and the second longitudinal edge 92. The reference center line C2 will serve as a reference for centering the main part 90 on the second conveyor 3.

After the reference center line C2 has been determined, the first conveyor 2 and the second conveyor 3 are simultaneously operated to convey the main part 90 of the breaker ply 9 in the conveying direction A of the first conveyor 2 from the first conveyor surface 21 onto the second conveyor surface 31. During the conveyance, the line camera 5 continues to obtain data about the lateral position of the first longitudinal edge 91 and the second longitudinal edge 92 along the main part 90, which data is continuously or regularly fed as detection signals to the control system 6. Based on the detection signals, the control system 6 determines the actual center for each set of lateral positions of the first longitudinal edge 91 and the second longitudinal edge 92 and, if necessary, sends control signals to the first lateral drive 22 for correcting deviations in the actual center with respect to the reference center line C2. Ultimately, the main part 90 is aligned or centered properly with respect to the reference center line C2 on the conveyor surface 31 of the second conveyor 3. Because of said centering with respect to the reference center line C2, the longitudinal edges 91, 92 are now arranged substantially symmetrical with respect to each other on each side of the reference center line C2.

It is noted that, as a less favorable alternative to aligning or centering the main part 90 of the breaker ply 9 with respect to the reference center line C2, the main part 90 may also be conveyed onto the second conveyor 3 while aligning the first longitudinal edge 91 in its entirety along the first edge reference line R1. This works well when the main part 90 of the breaker ply 9 has a substantially rectangular shape, as for example shown in FIG. 11A. However, when the main part 90 of the breaker ply 9 tapers or widens along its length, as for example shown in FIGS. 11B and 11C, then aligning the main part 90 along the first longitudinal edge 91 will result in the second longitudinal edge 92 deviating from the center. As a consequence, the main part 90 of the breaker ply 9 has an asymmetrical shape which can result in problems when applying the breaker ply 9 to the drum 4.

Figure 4:
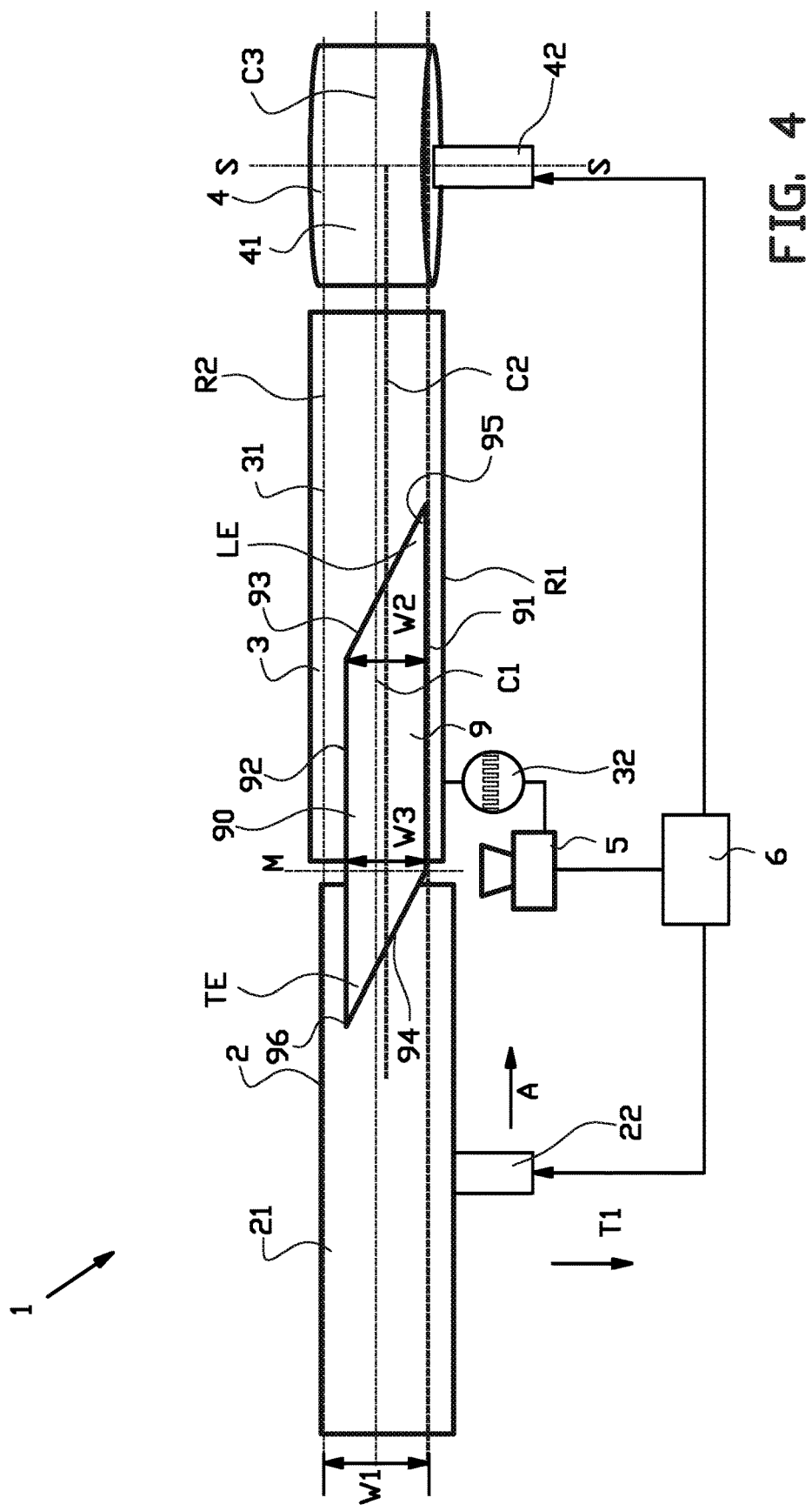

FIG. 4 shows the situation in which the breaker ply 9, apart from its trailing end TE, has been transferred onto the conveyor surface 31 of the second conveyor 3. The first longitudinal edge 91 has now been aligned along the first edge reference line R1 in a desired lateral position on the second conveyor surface 31, at least along the leading end LE of the breaker ply 9. The main part 90 has been centered with respect to the reference center line C2. During the conveyance of the main part 90 of the breaker ply 9 across the measuring line M, the line camera 5 continues to detect the lateral positions of both the first longitudinal edge 91 and the second longitudinal edge 92. As soon as the trailing end TE of the breaker ply 9 starts to cross the measuring line M, the line camera 5 starts to detect lateral positions of the trailing edge 94 which, due to its oblique angle with respect to the first longitudinal edge 91, causes a sudden decrease in the measured or determined width of the breaker ply 9 between the second longitudinal edge 92 and said lateral positions of the trailing edge 94. The data about the lateral positions is sends as detection signals to the control system 6, which derives or assumes from the sudden decrease that the trailing edge TE of the breaker ply 9 has started to move across the measuring line M.

The control system determines that the width between last measured lateral position of the second longitudinal edge 92, just before the sudden decrease in the width, and the lateral position of the first longitudinal edge 91, is representative for the actual width W3 of the breaker ply 9 at the transition from the main part 90 to the trailing end TE thereof. The actual width W3 at the transition from the main part 90 to the trailing end TE may differ from the actual width W2 determined at the transition from the leading end LE to the main part 90, in particular when the main part 90 tapers along its length. The control system 6 assigns a third edge reference line R3 to the last measured lateral position of the second longitudinal edge 92 before the trailing end TE, so that the second longitudinal edge 92 along the trailing end TE can be aligned along said third edge reference line R3.

After the determination of the third edge reference line R3, the breaker ply 9 is moved further onto the second conveyor surface 31 in the direction of conveyance B of the second conveyor 3. During said conveyance, the line camera 5 continuously or regularly measures the lateral position of the second longitudinal edge 92 along the trailing end TE of the breaker ply 9 and sends the data about the lateral positions to the control system 6 as detection signals. The control system 6 interprets the detection signals and sends control signals, if necessary, to the first lateral drive 22 to laterally move the first conveyor 2 with respect to the second conveyor 3. As a result of said lateral movement, deviations in the lateral position of said second longitudinal edge 92 along the third edge reference line R3 can be corrected. Ultimately, the second longitudinal edge 92, at least along the trailing end TE, is aligned properly along the third edge reference line R3. Slightly curvilinear deviations in the second longitudinal edge 92 can be corrected to a more linear shape.

Figure 5:
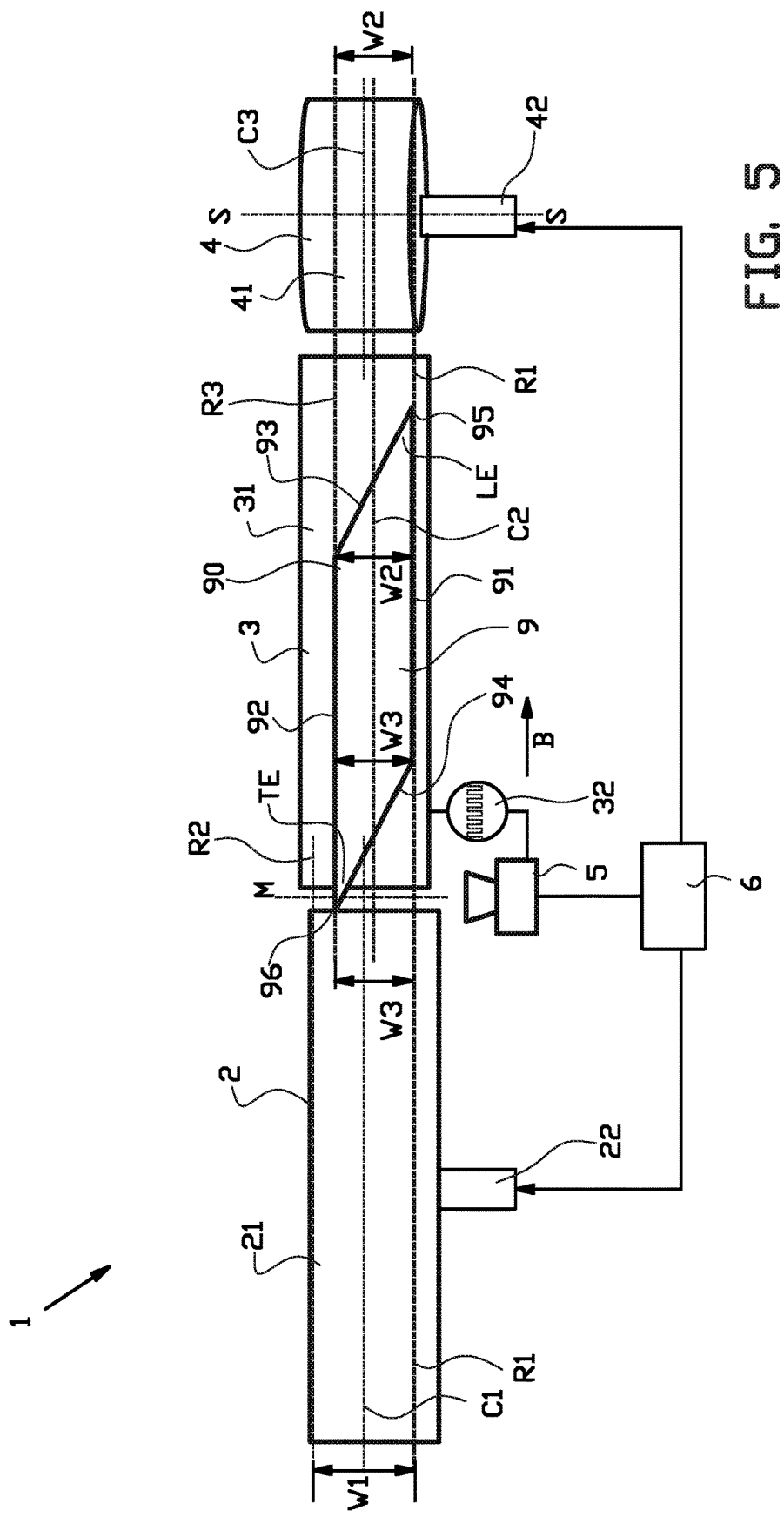

FIG. 5 shows the situation in which the breaker ply 9 has almost cleared the measuring line M and the line camera 5 no longer detects its contour. After the breaker ply 9 has cleared the first conveyor 2, the next stage of the centering can commence. The leading tip 95 of the breaker ply 9 has not yet moved onto the circumferential surface 41 of the drum 4. Prior to the leading tip 95 moving onto the circumferential surface 41, the control system 6 can determine, based on the obtained data, the distance over which the drum 4 has to be translated in the second transverse direction T2 to position the reference center line C2 of the breaker ply 9 in line with the center plane C3 of the desired application position at the drum 4. Now, the control system 6 controls the drum 4 downstream of the position at which the measurement has taken place. Thus, in this particular situation, the control system 6 functions as a feedforward control system 6.

In FIG. 6, the situation is shown in which the second drive 42 has been actuated to move the drum 4 in the second transverse direction T2. The drum 4 is moved over the distance determined by the control system 6, so that the reference centerline C2 is aligned or in line with the center plane C3 at the drum 4. Once the actual centerline C2 of the breaker ply 9 is aligned with the center plane C3 at the drum 4, the second conveyor 3 and the drum 4 are simultaneously operated to convey the breaker ply 9 in the second conveying direction B from the second conveyor surface 31 onto desired application position at the circumferential surface 41.

FIG. 7 shows the situation in which the breaker ply 9 has almost been moved by the second conveyor 3 onto the circumferential surface 41 of the drum 4 with its actual centerline C2 centered or aligned on the center plane C3 of the desired application position at the drum 4. This completes the method.

Figure 8:
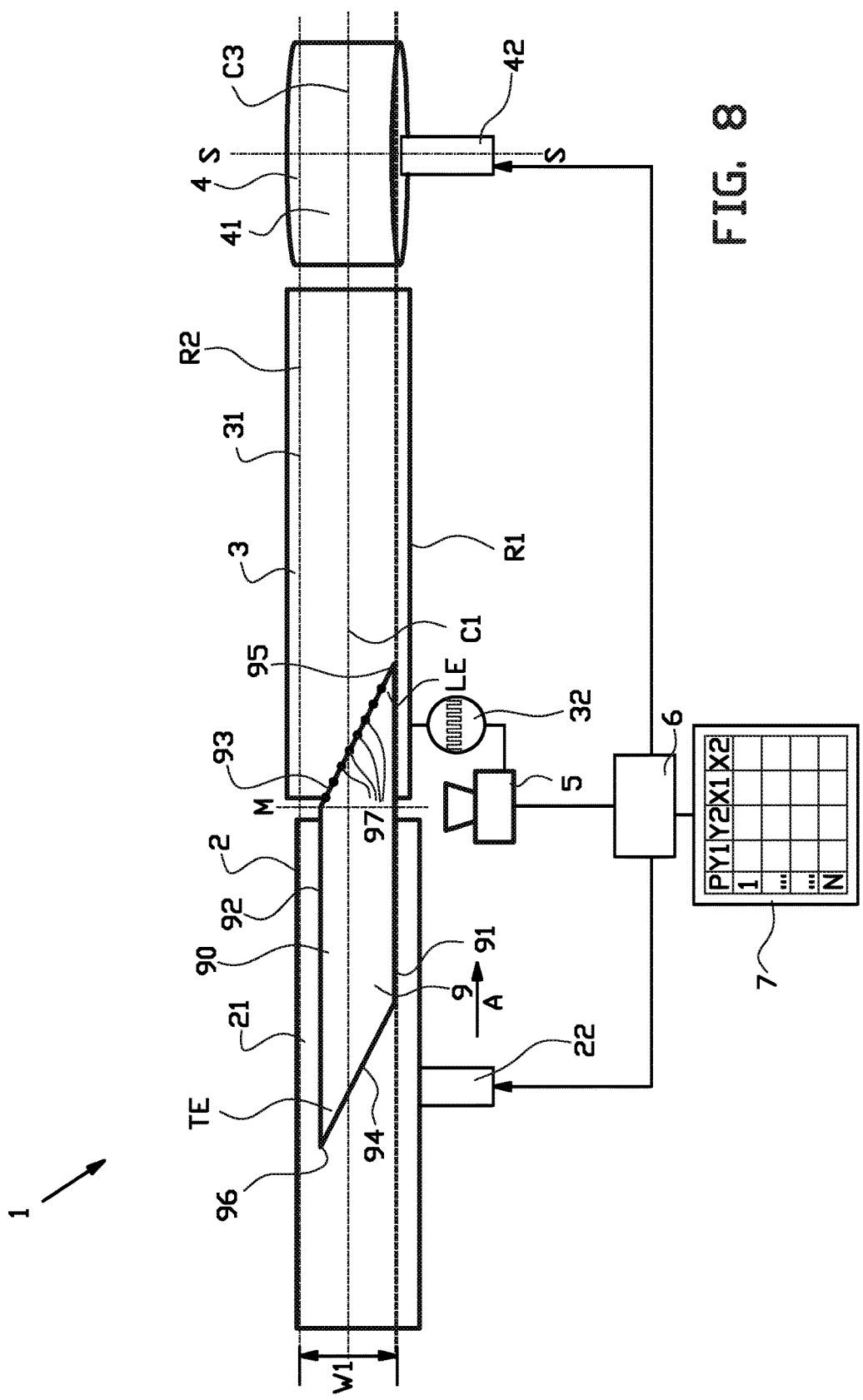
FIGS. 8 and 9 show two alternative steps of the method for centering the breaker ply on the drum according to FIG. 1.
Figure 9:
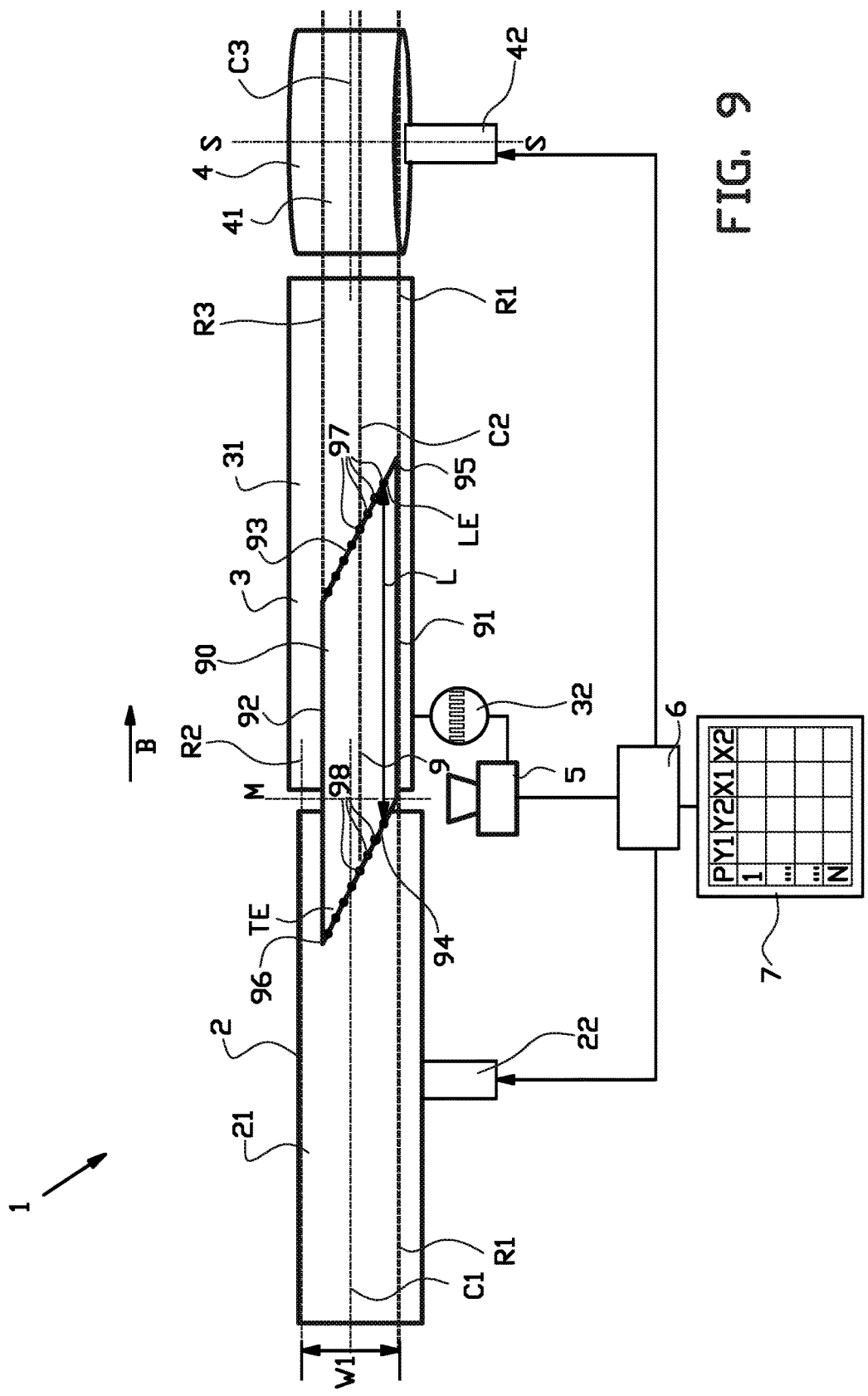

FIGS. 8 and 9 show steps of an alternative method. In the alternative method, instead of aligning the second longitudinal edge 92 at the trailing end TE along the third edge reference line R3, the trailing edge 94 is aligned or corrected to match the shape of the leading edge 93. In this manner, the quality of the splice between the trailing edge 94 and the leading edge 93 after application of the breaker ply 9 at the drum 4 can be improved.

For the purpose of the abovementioned splice matching, data about the lateral positions of the leading edge 93 as received from the line camera 5 is collected for each pulse P of the encoder 32, after said lateral position has been aligned with the first reference line R1 in accordance with FIGS. 2 and 3. The speed of conveyance is relatively slow with respect to the transverse speed of the first conveyor 2. Thus, the lateral positions after alignment can still be detected by the same line camera 5, directly after the alignment has taken place. Optionally, the data is collected with a further sensor, for example a further line camera arranged directly downstream of the line camera 5, to detect the relevant lateral positions after alignment. The data is subsequently processed by the control system 6 and stored as a first lateral coordinate Y1 in a table 7 of a memory component of the control system 6 as shown in FIG. 8. Optionally, the lateral position of the first longitudinal edge 91, after the alignment in FIGS. 2 and 3, is also stored in said table 7 as a second lateral coordinate Y2. For each of the lateral coordinates Y1 and/or Y2, the corresponding longitudinal position in the direction of conveyance B of the second conveyor 3 is logged in the aforementioned table 7 as a first longitudinal coordinate X1 or as another parameter, for example an increment, that links the lateral coordinates Y1 and/or Y2 to the pulses P of the encoder 32.

For each first longitudinal coordinate X1, a second longitudinal coordinate X2 is entered at a predetermined distance or length upstream of the first longitudinal coordinate X1, parallel to the direction of conveyance B of the second conveyor 2. The distance or length corresponds to the desired circumferential length L of the breaker ply 9 when applied on the drum 4 or to the circumferential length of the circumferential surface 41 of the drum 4 itself.

The main part 90 of the breaker ply 9 is subsequently moved over the measuring line M and centered with respect to the reference center line C2, in accordance with FIGS. 3 and 4. When the trailing edge 94 moves across the measuring line M in FIG. 5, the line camera 5 detects the trailing edge 94 and sends data about the lateral positions of the trailing edge 94 to the control system 6 as shown in FIG. 9. For each longitudinal position that matches one of the second longitudinal coordinates X2 as stored in the table 7, the control system 6 compares the data from the line camera 5 on the lateral positions of trailing edge 94 at said longitudinal position with the lateral coordinates Y1, Y2 as stored in the table 7 of the control system 6 for the corresponding first longitudinal coordinate X1 at the leading edge 93. In case of deviations in the lateral positions of the trailing edge 94 with respect to the lateral positions of the leading edge 93, the control system 6 sends control signals to the first lateral drive 22 to move the first conveyor 2 laterally with respect to the second conveyor 3, in order to correct the deviation and to match the lateral positions of the trailing edge 94 with the stored lateral positions of the leading edge 93.

Ultimately, the shape of the trailing edge 94 is substantially matched to the shape of the leading edge 93. In addition, by performing the corrections at the second longitudinal coordinates X2, it is ensured that the longitudinal distance between the corresponding lateral positions at the leading edge 93 and the trailing edge 94 are substantially or exactly at the predetermined length L. Thus, when the breaker ply 9 is applied to the drum 4, the circumferential length of the breaker ply 9 is sufficient to allow the leading edge 93 and the trailing edge 94 to meet, in order to close the splice.

Figure 11A:
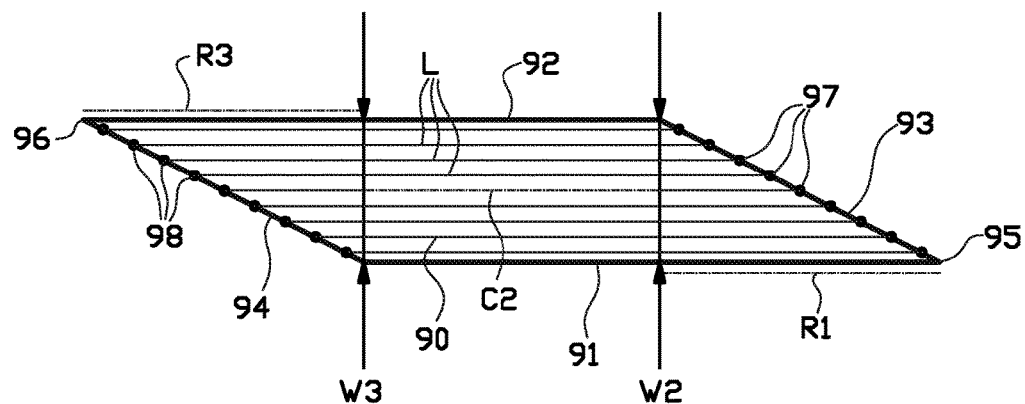
FIGS. 11A, 11B and 11C show the effect of the centering process on various shapes of the breaker ply according to FIG. 1.
Figure 11B:
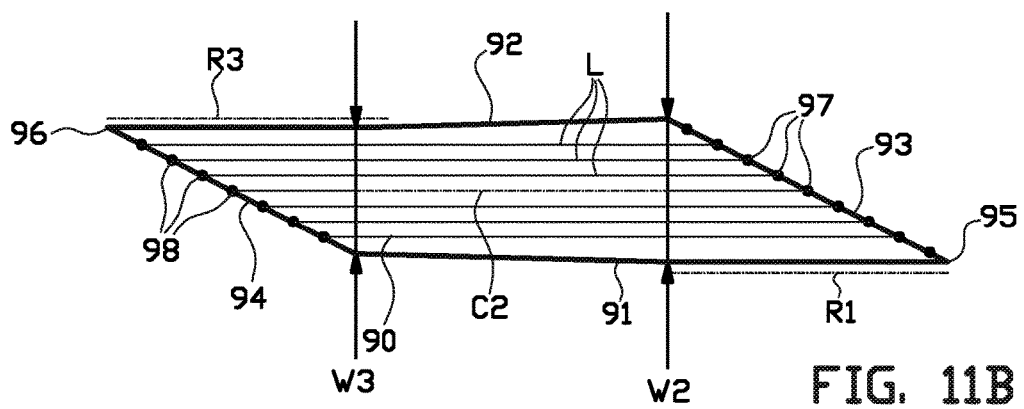
Figure 11C:
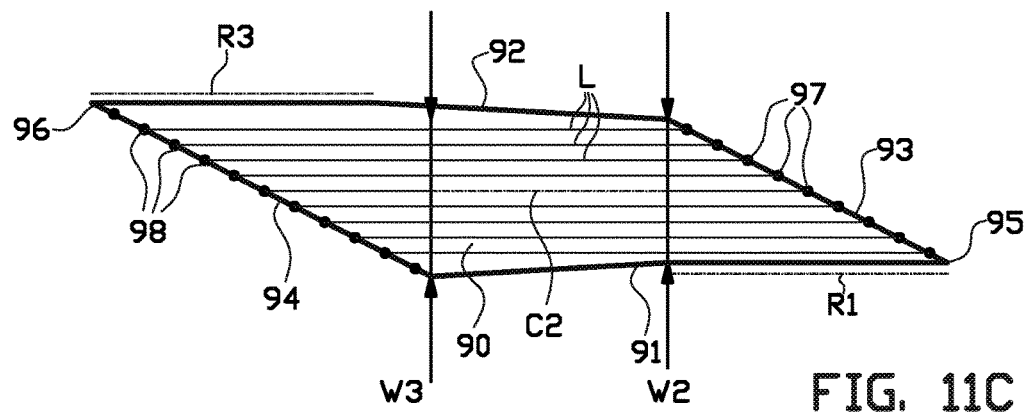

FIGS. 11A, 11B and 11C show three examples of breaker plies 9 after alignment or centering according to any one of the abovementioned methods. The figures are schematic. In practice, the ratios, contours and dimensions of the breaker ply 9 may differ. Also, the edge reference lines R1, R3 have been placed just outside of the contour of the breaker ply 9 to make them visually stand out from said contour. In practice, the longitudinal edges 91, 92 will be aligned on top of the edge reference lines R1, R3.

FIG. 11A shows a breaker ply 9 with a substantially rectangular main part 90, having substantially the same actual width W2 at the transition from the leading end LE to the main part 90, as the actual width W3 at the transition from the main part 90 to the trailing end TE. The first longitudinal edge 91 at the leading end LE is aligned along the first reference line R1. At the transition from the leading end LE to the main part 90, the actual width W2 and/or the lateral positions of the longitudinal edges 91, 92 are determined. A reference center line C2 is assigned to the lateral center between the longitudinal edges 91, 92 at said actual width W2 and the rest of the main part 90 is aligned or centered with respect to said reference center line C2. Finally, at the transition from the main part 90 to the trailing end TE, the actual width W3 and/or the lateral positions of the longitudinal edges 91, 92 are again determined and a third reference line R3 is assigned to the position of the second longitudinal edge 92 at said actual width W3. Subsequently, the second longitudinal edge 92 at the trailing end TE is aligned along the third reference line R3. Instead of aligning the second longitudinal edge 92 at the trailing end TE along the third reference line R3, the lateral coordinates 97 of the leading edge 93 may be stored in memory, and may be used to match the lateral coordinates 98 of the trailing edge 94 at the predetermined distance L from and in the lateral positions of the corresponding lateral coordinates 97 at the leading edge 93, as shown in FIGS. 8 and 9.

FIG. 11B shows a breaker ply 9 with a main part 90 that tapers. In particular, the main part 90 narrows in the upstream direction, such that the actual width W2 at the transition from the leading end LE to the main part 90 is greater than the actual width W3 at the transition from the main part 90 to the trailing end TE. The method of aligning or centering this breaker ply 9 is substantially the same as the aforementioned method. However, it can be observed that the longitudinal edges 91, 92 at the main part 90 are not parallel, but converge in the upstream direction as the lateral positions of the longitudinal edges 91, 92 are centered with respect to the center reference line C2. Also, some of the lateral coordinates taken at leading edge 93 can not be used for the splice matching of the trailing edge 94, as they do not have a corresponding lateral coordinate in the smaller trailing edge 94.

FIG. 11C shows a breaker ply 9 with a main part that tapers in the opposite direction with respect to FIG. 11B. In particular, the main part 90 narrows in the downstream direction, such that the actual width W2 at the transition from the leading end LE to the main part 90 is smaller than the actual width W3 at the transition from the main part 90 to the trailing end TE. The method of aligning or centering this breaker ply 9 is again substantially the same as the aforementioned method. However, it can be observed that the longitudinal edges 91, 92 at the main part 90 are not parallel, but diverge in the upstream direction as the lateral positions of the longitudinal edges 91, 92 are centered with respect to the center reference line C2. Also, the trailing edge 94 can only partly be shaped to match the shape of the leading edge 93, as not all of the lateral coordinates of the trailing edge 94 have a corresponding lateral coordinate at the leading edge 93.

Figure 10:
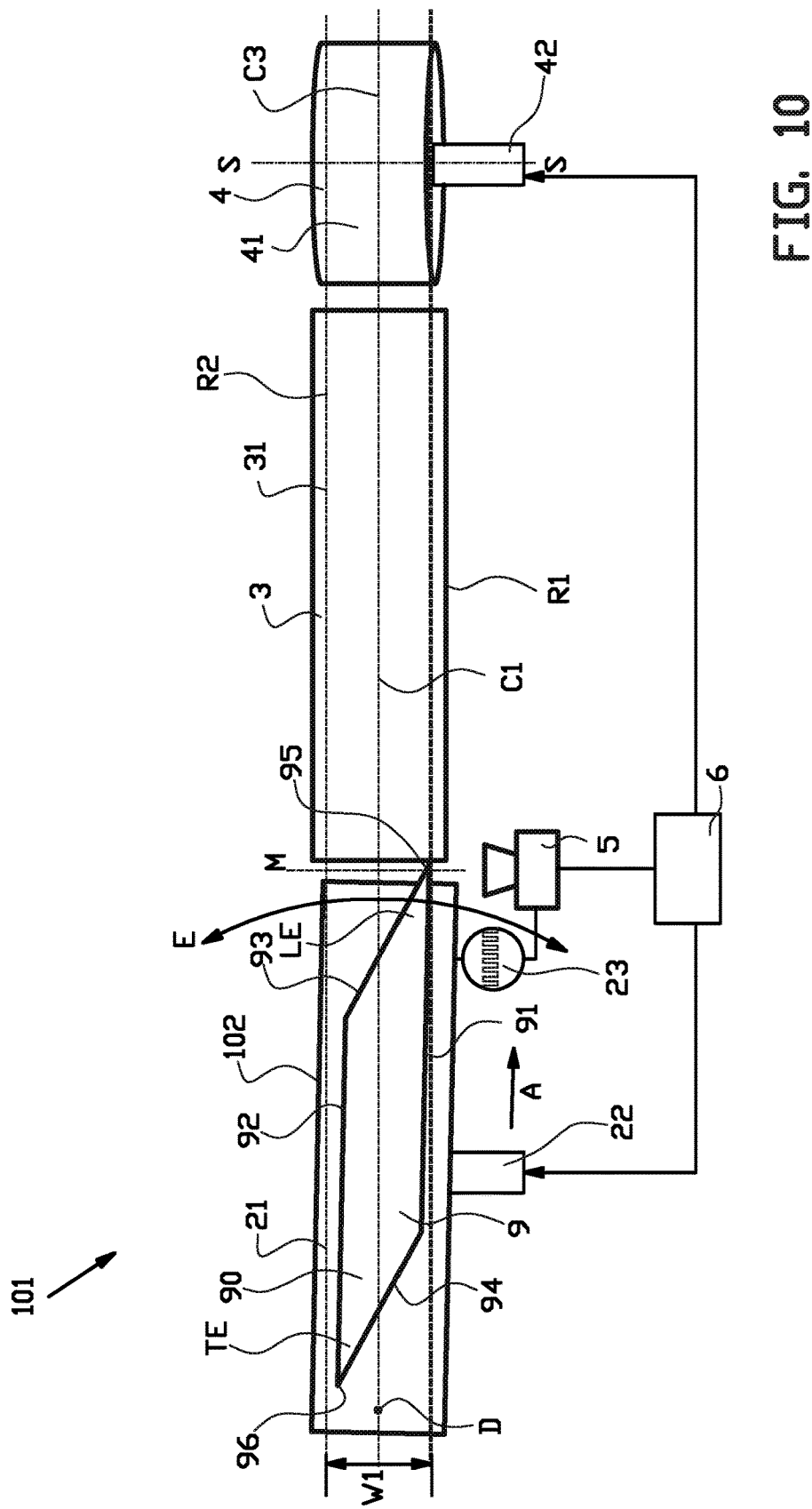
FIG. 10 shows an alternative centering assembly with an alternative first conveyor, according to a second embodiment of the invention.

FIG. 10 shows an alternative centering assembly 101 in which most parts are identical to the centering assembly 1 as shown in FIGS. 1-9, except for an alternative first conveyor 102. The alternative first conveyor 102 is pivoted or rotated in a rotation E about a pivot point D at the upstream end of the alternative first conveyor 102 with respect to the second conveyor 3. The axis of rotation (not shown) is substantially vertical, such that the alternative first conveyor 102 pivots in a substantially horizontal plane. The rotation E causes the downstream end of the alternative first conveyor 102 to move substantially laterally, or at least transverse, with respect to the direction of conveyance B of the second conveyor 3. The rotation E of the alternative first conveyor 102 about the pivot point D allows for the control of the lateral position at which the breaker ply 9 is transferred or conveyed from the alternative first conveyor 102 onto the second conveyor 3, for the same purpose of aligning and centering the breaker ply 9, as shown in FIGS. 1-5. This way of transversely moving the alternative first conveyor 102 is particularly effective when the alternative first conveyor 102 is very long, such that the required angles of rotation E are minor and do not or only slightly deform the breaker ply 9 when moving from the slightly angled direction of conveyance A of the alternative first conveyor 102, into the direction of conveyance B of the second conveyor 3.

It is noted that, in a preferred embodiment of the methods as presented above, a subsequent cycle of the same method is already prepared prior to ending the previous cycle. In other words, the first centering step of a subsequent cycle may at least partly overlap the second centering step of the previous cycle. In particular, it is noted that a subsequent breaker ply 9 can already be supplied to or placed on the first conveyor surface 21 of the first conveyor 2 while the previous breaker ply 9 is being conveyed from the first conveyor 2 to the second conveyor 3 in FIG. 3. Shortly after the previous breaker ply 9 has cleared the measuring line M, the subsequent breaker ply 9 can already be conveyed in the direction of conveyance A of the first conveyor 2 until its leading tip crosses or intersects with the measuring line M, analogous to the situation as shown in FIG. 2.

Provided that the first conveyor 2 and the second conveyor 3 have an equal speed of conveyance, the subsequent breaker ply 9 can even be transferred onto the second conveyor surface 31 shortly after the previous breaker ply 9. This can take place even if the previous breaker ply 9 has not yet completely been transferred from the second conveyor surface 31 onto the circumferential surface 41 of the drum 4. During the transfer of the subsequent breaker ply 9 onto the second conveyor surface 31, its leading end LE can already be aligned with the first edge reference line R1 by translation of the first conveyor 2, analogous to the situations as shown in FIGS. 2 and 3, regardless of the centering taking place with respect to the previous breaker ply 9 at the transfer from the second conveyor 3 to the drum 4. In this manner, the capacity of the centering assembly 1 can be significantly increased.

If the subsequent breaker ply 9 is cut from the same continuous length as the previous breaker ply 9, the subsequent breaker ply 9 is likely to have substantially the same actual width W2. Thus, only a small correction of the alignment is required to position the leading tip 95 of the subsequent breaker ply 9 along the first edge reference line R1. If a larger deviation in the widths W2, W3 of the subsequent breaker ply 9 with respect to the widths W2, W3 of the previous breaker ply 9 is to be expected, it is wise to return the first conveyor 2 to the initial position as shown in FIG. 1, prior to performing the subsequent steps of the method.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

In summary, the invention relates to a method and centering assembly for centering a tire component, wherein the method comprises the steps of placing the tire component on and conveying it from the first conveyor towards a second conveyor, determining the position of a first longitudinal edge, transversely moving the first conveyor and thereby aligning the first longitudinal edge along a first reference on the second conveyor, conveying the tire component from the first conveyor onto the second conveyor while determining the position of a second longitudinal edge, wherein the tire component has a center between the first longitudinal edge and the second longitudinal edge, conveying the tire component from the second conveyor towards the drum, laterally moving the drum to align the center of the tire component with a center of a desired application position of the tire component on the drum, and conveying the tire component from the second conveyor onto the drum.

The invention claimed is:

1. A method for centering a tire component with the use of a centering assembly, wherein the tire component comprises a leading end, a trailing end and a main part between the leading end and the trailing end, wherein the tire component is provided with a first longitudinal edge and a second longitudinal edge extending at least along the main part, wherein the centering assembly comprises a first conveyor, a second conveyor and a drum, wherein the method comprises the steps of;

a) placing the tire component on the first conveyor with its leading end facing in a first direction of conveyance defined by the first conveyor;
  b) conveying the tire component from the first conveyor towards the second conveyor in the first direction of conveyance;
  c) determining, at or near the leading end of the tire component, a lateral position of the first longitudinal edge with respect to a second direction of conveyance defined by the second conveyor;
  d) moving the first conveyor transverse to the second direction of conveyance and thereby aligning the first longitudinal edge laterally, at least at the leading end, with respect to the second direction of conveyance along a first edge reference for said first longitudinal edge on the second conveyor;

e) conveying the tire component from the first conveyor onto the second conveyor in the first direction of conveyance while determining a lateral position of the second longitudinal edge with respect to the second direction of conveyance to thereby determine a lateral center of the tire component between the determined lateral positions of the first longitudinal edge and the second longitudinal edge as the tire component is conveyed from the first conveyor onto the second conveyor;

f) conveying the tire component from the second conveyor towards the drum in the second direction of conveyance;

g) moving the drum laterally with respect to the second direction of conveyance to align a lateral center of a desired application position of the tire component on the drum with the determined lateral center of the tire component; and h) conveying the tire component from the second conveyor onto the drum for application of the tire component at the desired application position.

2. The method according to claim 1, wherein the lateral position of the first longitudinal edge is determined and the first conveyor is transversely moved prior to step e).

3. The method according to claim 1, wherein the second longitudinal edge is determined and the drum is laterally moved prior to step h).

4. The method according to claim 1, wherein the lateral position of the first longitudinal edge is determined in step c) between the first conveyor and the second conveyor.

5. The method according to claim 1, wherein the lateral position of the second longitudinal edge is determined in step e) between the first conveyor and the second conveyor.

6. The method according to claim 1, wherein the leading end is provided with a leading edge extending under an oblique angle with respect to the longitudinal edges, wherein the first longitudinal edge extends along the main part and the leading end, wherein at least part of the first longitudinal edge at the leading end of the tire component is aligned along the first edge reference for said first longitudinal edge in step d).

7. The method according to claim 1, wherein, in step e), the lateral position of the second longitudinal edge is first determined at or near the transition from the leading end to the main part, wherein, during the subsequent conveyance of the tire component from the first conveyor to the second conveyor in step e), the first conveyor is moved transverse with respect to the first direction of conveyance for aligning the lateral center of the tire component, at least at the main part, with the lateral center between the determined lateral positions of the longitudinal edges at or near the transition from the leading end to the main part.

8. The method according to claim 1, wherein the trailing end is provided with a trailing edge extending under an oblique angle with respect to the longitudinal edges, wherein the second longitudinal edge extends along the main part and the trailing end, wherein, after the determination of the lateral position of the second longitudinal edge in step e), at least part of the second longitudinal edge at the trailing end of the tire component is aligned along a second edge reference for said second longitudinal edge on the second conveyor in step e).

9. The method according to claim 1, wherein the leading end and the trailing end are provided with a leading edge and a trailing edge, respectively, extending under an oblique angle with respect to the longitudinal edges, wherein during the conveyance of the trailing end from the first conveyor to the second conveyor in step e), the first conveyor is moved transverse to the second direction of conveyance to match the shape of at least part of the trailing edge to the shape of the leading edge.

10. The method according to claim 1, wherein the centering assembly is provided with one or more sensors for detecting the lateral positions of one or more edges of the tire component and a control system that controls the transverse movement of the first conveyor and the lateral movement of the drum in steps d) and g) based on the detection of the lateral positions of the one or more edges by the one or more sensors.

11. The method according to claim 10, wherein the one or more sensors are arranged between the first conveyor and the second conveyor.

12. The method according to claim 10, wherein the one or more sensors comprise a line camera for detecting the lateral positions of one or more edges of the tire component along a laterally extending detection line.

13. The method according to claim 10, wherein the control system controls the transverse movement of the first conveyor in step d) upstream of the one or more sensors.

14. The method according to claim 10, wherein the control system controls the lateral movement of the drum in step g) downstream of the one or more sensors.

15. The method according to claim 10, wherein step d) comprises determining the lateral position of the first longitudinal edge based on the detection signals from the one or more sensors, comparing the determined lateral position to a desired lateral position on the second conveyor for said first longitudinal edge, determining the required amount of transverse movement of the first conveyor with respect to the second conveyor for aligning the determined lateral position of the first longitudinal edge with the desired lateral position, sending a control signal from the control system to a first drive associated with the first conveyor for controlling the transverse movement of the first conveyor until the determined lateral position of the first longitudinal edge is aligned along the desired lateral position for said first longitudinal edge.

16. The method according to claim 10, wherein step e) comprises determining the lateral position of the second longitudinal edge based on the detection signals from the one or more sensors, wherein step g) comprises determining the lateral center between the determined lateral positions of the first longitudinal edge and the second longitudinal edge, determining the required amount of lateral movement of the drum with respect to the second conveyor for aligning the lateral center of tire component with the center of the desired application position on the drum, sending a control signal from the control system to a second drive associated with the drum for controlling the lateral movement of the drum until the determined lateral center of the tire component is aligned with the center of the desired application position on the drum.

17. The method according to claim 16, wherein the determination of the lateral center comprises the step of the control system assigning a center reference to the lateral center between the determined lateral positions of the first longitudinal edge and the second longitudinal edge at least at one longitudinal position along the tire component.

18. The method according to claim 10, wherein the leading end and the trailing end are provided with a leading edge and a trailing edge, respectively, extending under an oblique angle with respect to the longitudinal edges, wherein during the conveyance of the trailing end from the first conveyor to the second conveyor in step e), the first conveyor is moved transverse to the second direction of conveyance to match the shape of at least part of the trailing edge to the shape of the leading edge, wherein the control system is provided with a memory component, wherein the matching of the shape of the at least part of the trailing edge to the shape of the leading edge during step e) comprises determining and storing lateral positions of the leading edge based on the detection signals from the one or more sensors, determining for each of the stored lateral positions of the leading edge, at a predetermined distance upstream of the stored lateral position, the lateral position of the trailing edge, comparing the determined lateral position of the trailing edge to the stored lateral position of the leading edge, determining the required amount of transverse movement of the first conveyor with respect to the second conveyor for aligning the determined lateral position of the trailing edge with the stored lateral position of the leading edge, sending a control signal from the control system to a first drive associated with the first conveyor for controlling the transverse movement of the first conveyor until the determined lateral position of the trailing edge is aligned at the stored lateral position of the leading edge.

19. The method according to claim 18, wherein the predetermined distance corresponds to the desired circumferential length of the tire component when the tire component is applied to the drum.

20. The method according to claim 1, wherein the transverse movement of the first conveyor is a lateral movement.

21. The method according to claim 1, wherein the transverse movement of the first conveyor comprises a rotation of an end of the first conveyor facing the second conveyor about a pivot point located at the opposite end of the first conveyor with respect to the second conveyor.

22. The method according to claim 1, wherein between steps b) and g), a subsequent cycle of the steps of the method is already started by placing a subsequent tire component on the first conveyor according to step a) and/or by conveying the subsequent tire component from the first conveyor towards the second conveyor according to step b).

23. The method according to claim 22, wherein one or both of steps c) and d) for a subsequent cycle of the method take place simultaneously with one or both of steps f) and g) of the previous cycle of the method.

24. The method according to claim 22, wherein the subsequent tire component is moved in the first direction of conveyance at a distance from the tire component that is previously conveyed in said first direction of conveyance.

* * * * *